United States Patent [19]

Chang et al.

[11] B 3,919,701

[45] Nov. 11, 1975

[54] SYMMETRIC SWITCHING FUNCTIONS USING MAGNETIC BUBBLE DOMAINS

[75] Inventors: Hsu Chang, Yorktown Heights, N.Y.; Tien Chi Chen; Chin Tung, both of San Jose, Calif.

[73] Assignee: International Business Machines Corporation, Armonk, N.Y.

[22] Filed: Apr. 16, 1973

[21] Appl. No.: 351,665

[44] Published under the Trial Voluntary Protest Program on January 28, 1975 as document no. B 351,665.

[52] U.S. Cl.340/174 TF; 340/174 SR; 340/174 GA; 307/88 LC

[51] Int. Cl.$^2$ .................... G11C 11/14; G11C 19/00

[58] Field of Search. 340/174 TR, 174 SR, 174 GA; 307/88 LC

[56] References Cited

UNITED STATES PATENTS

| | | | |
|---|---|---|---|
| 3,670,313 | 6/1972 | Beausoleil et al. | 340/174 TF |
| 3,678,287 | 7/1972 | Chow | 340/174 GA |
| 3,680,067 | 7/1972 | Chow | 340/174 TF |
| 3,689,902 | 9/1972 | Chang et al. | 340/174 TF |
| 3,701,125 | 10/1972 | Chang et al. | 340/174 TF |
| 3,701,132 | 10/1972 | Bonyhard | 340/174 TF |
| 3,711,842 | 1/1973 | Chow | 340/174 TF |
| 3,743,788 | 7/1973 | Krupp et al. | 340/174 TF |
| 3,753,253 | 8/1973 | Smith | 340/174 TF |
| 3,760,390 | 9/1973 | Murakami | 340/174 TF |
| 3,803,564 | 4/1974 | Murakami | 340/174 GA |

*Primary Examiner*—Stanley M. Orynowicz, Jr.
*Attorney, Agent, or Firm*—Jackson E. Stanland

[57] ABSTRACT

A symmetric switching device which can be personalized to do any mathematical operation relying upon the counting of the number of bubble domains present. This can be used as a universal logic element to provide any logical function. The device will handle multiple inputs and is rewritable to provide the desired function. The device broadly comprises a counter for counting the number of 1 bits in the input data stream, a means for producing a control data stream for personalizing the switch, and a comparison means for comparing the counter output and the control stream. A particularly suitable embodiment comprises a bubble domain sifter for shifting the position of the bubbles in the input data stream, a leading bubble detector for detecting the leading (first) bubble in the input data stream, means for creating a personalized control bubble stream for designating the function to be performed, and means for comparing the personalized control bubble stream with the output of the leading bubble detector to provide a circuit output representing the output value of the function desired. Means are provided for serial or parallel data inputs to the symmetric switching circuit. Any known type of domain propagation structure can be used to implement this device.

34 Claims, 12 Drawing Figures

SYMMETRIC SWITCHING FUNCTIONS USING MAGNETIC BUBBLE DOMAINS

BACKGROUND OF THE INVENTION

1. Field of the Invention

This invention relates to bubble domain circuitry and more particularly to a symmetric switching circuit implemented with magnetic bubble domains.

2. Description of the Prior Art

Various logic devices using magnetic bubble domains are known in the art, as can be seen by referring to IBM Technical Disclosure Bulletin, Vol. 13, No. 6, November 1970, page 1581, and also U.S. Pat. No. 3,541,522. These logic devices are characterized in that interactions between two bubble domains are used to provide the logic function. Generally, prior art bubble domain logic devices have circuit structures which will each perform only one function, or a minimum number of logic functions. For example, a circuit to perform the OR function is generally different than a circuit to perform the AND function.

Since prior art bubble domain logic devices utilize different circuitry for the performance of different functions, it has been difficult to blend memory and logic devices on the same magnetic medium, since the density requirements of each are different. For memory, density is achieved by a large number of repetitive cells as opposed to logic where a great variety of cells are used, due to the requirement of different circuitry for the performance of different functions. This in turn leads to the requirement of extra logic circuits for data routing and data management. This has the disadvantage of requiring many interconnections and increased fabrication difficulties.

In addition to the problem of real estate on a magnetic medium, prior art bubble domain logic devices are not especially fast. The interaction of two bubble domains is useful only for executing simple logic connectives (e.g., OR, AND, etc.). For multiple input logic connectives, and for more complicated functions (e.g., carry, sum, etc.), the execution must be carried out by performing simple two-input logic connectives in stages, resulting in great delay. It would be advantageous to provide a multiple input logic device which does not have this disadvantage.

Each of the prior art logic devices are essentially established beforehand (with the possible exception of aforementioned U.S. Pat. No. 3,541,522 where logic functions are programmed by signals on coincident current conductors). It is very advantageous to provide the same basic circuit structure and to personalize it for the performance of any desired logical and control function. Additionally, it is advantageous to provide a device for performing a plurality of logic functions without requiring a large number of external interconnections, as is present in U.S. Pat. No. 3,541,522.

To overcome the disadvantages of prior art bubble domain logic devices and to make bubble domain logic attractive in terms of system organization and fabrication, it is proposed to provide a symmetric switching device which is rewritable to perform many mathematical functions. In this manner, a universal logic element is provided which uses the same circuit structure for the performance of all functions and which requires a minimum amount of space.

Accordingly, it is a primary object of the present invention to provide a bubble domain device capable of performing symmetric switching functions.

It is another object of the present invention to provide a bubble domain universal logic network.

It is still another object of the present invention to provide a single bubble domain device for handling all possible logic functions using only a predictable minimum amount of circuitry.

It is a further object of this invention to provide a device which can do any mathematical operation based on the counting of the number of bubble domains in an input data stream of bubble voids.

It is a still further object of this invention to provide a bubble domain logic device having increased versatility and a minimum number of external interconnections.

It is another object of this invention to provide a symmetric switching function using bubble domains which will perform symmetric switching functions in a minimum number of steps.

It is still another object of this invention to provide a symmetric switching function for magnetic bubble domains which will accommodate a plurality of data inputs.

It is a still further object of this invention to provide a universal logic element using bubble domains which is rewritable.

It is a still further object of this invention to provide a magnetic bubble domain device for performing symmetric switching functions which has high density and which can be incorporated with magnetic bubble domain storage on the same magnetic medium.

SUMMARY OF THE INVENTION

The mathematics of symmetric switching functions will be described in more detail in a later section. At this point, it is only necessary to state that provision of the function requires a counting means for counting the number of bubble domains in the input data stream (bubbles/voids), a means for producing a control bubble stream (bubbles/voids) indicative of the function to be performed, and a comparison means for comparing the counter output and the control bubble stream.

This function is desirably realized by a gravitation of one-bits (bubbles) in the input data (i.e., a stream of information represented by the presence and absence of bubble domains), detection of the leading bubble domain in the gravitated stream of data, generation of a control data stream defining the function to be performed, and comparison between the control data stream and the gravitated input data stream to decide if a match exists. If a match exists, the particular function indicates that the inputs call for an output bubble domain. For instance, if all inputs are bubble domains and an AND function is to be performed, the output of the symmetric device will be a bubble domain. If not all of the inputs are bubble domains and an AND function is to be performed, the device will provide no bubble domain output.

To achieve the symmetric switching function, means are provided to gravitate the bubbles (viz. ONEs) in the input data stream. The means for performing a gravitation generally consists of means for sifting the input data to move bubble domains in a given direction. For instance, if the input data is 1010, where a 1 is the presence of a domain and a 0 is the absence of a domain, sifting will move the 1 bits either to the left or to the right. This sifting operation is conveniently provided by a series of bubble domain idlers, the number of idlers equaling the number of bits in the input data stream. In this manner, the input data can be directly entered into the idler positions and moved in a particular direction when a series of pusher domains enters the idlers. This will move all data 1 bits in a preferred direction.

A leading bubble domain detector is provided to indicate the position of the leading 1 bit in the gravitated input data stream. The position of this leading domain is related to the number of bubble domains (1 bits) in the input data stream, and the length of the input data stream. Since all the information which is required to perform symmetric switching functions is contained in this leading bubble domain, the other bubble domains in the gravitated data stream are removed from the device, and can conveniently be delivered to an annihilator or rerouted if necessary.

Means are provided to create a control stream of bubble domains which defines the function to be performed. For instance, if there are four data bits in the input data stream and an AND function is to be performed, the controlled stream of domains will have a bubble domain in its fourth position to indicate that an AND function is to be performed. That is, only when all four data bits are bubble domains should an output be provided from the symmetric switching device. Thus, the control stream has a bubble domain(s) in a certain position(s) indicating the function to be performed.

Means are also provided for comparing the control bubble domain stream with the output of the leading bubble detector (which contains a bubble domain only in the position indicated by the leading bubble domain of the gravitated input data). This comparison means is generally an AND gate which will provide an output when a positive comparison exists. Thus, if the bubble domain in the output of the leading bubble detector is matched with a bubble domain in the control bubble stream, the symmetric switching device will provide an output bubble domain. If the leading bubble domain detector does not provide a bubble domain output which is matched with a bubble domain in the control bubble stream, the symmetric switching device will provide no bubble domain output.

Means are provided to enter the data from a plurality of data streams serially or in parallel. Additionally, the circuit structure required to perform these functions can be provided with any known bubble domain components, including propagation elements comprising soft magnetic elements and conductor loops, among others.

These and other objects, features, and advantages will be more apparent from the following more particular description of the preferred embodiments.

DETAILED DESCRIPTION OF THE PREFERRED EMBODIMENTS

Symmetric Switching Functions

Figure 1:
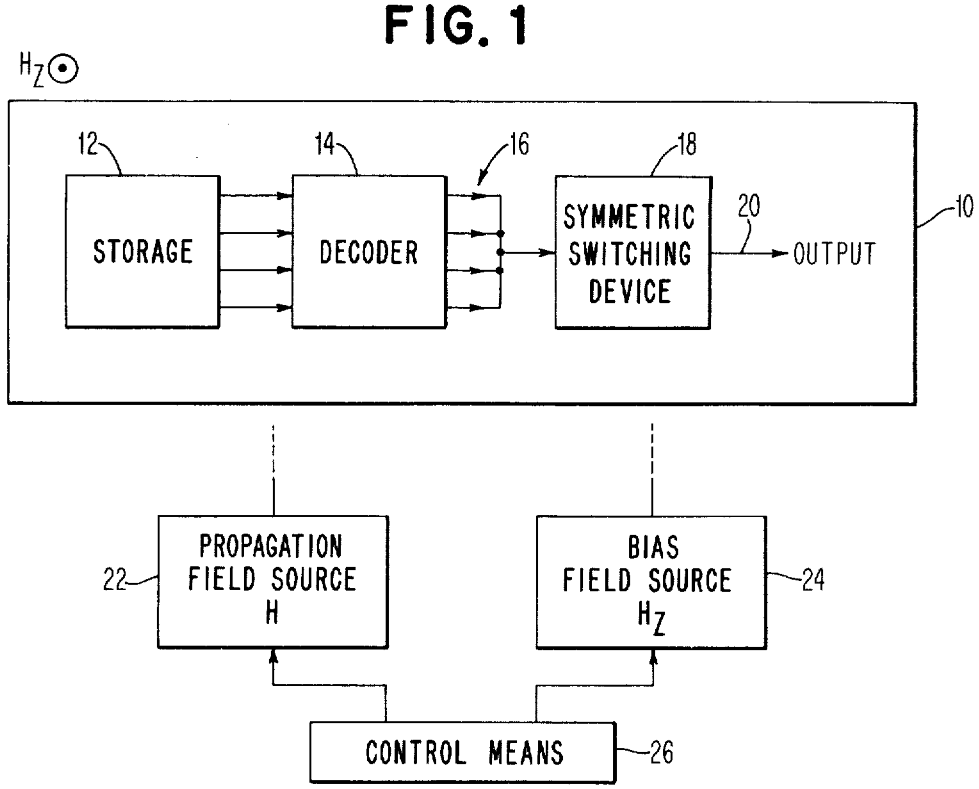
FIG. 1 is a block diagram of a bubble domain system having storage and memory functions, including symmetric switching, on the same magnetic medium.

Before proceeding to the structures used to implement symmetric switching functions, it is helpful to consider the mathematics of such functions. The function $$S(A|X) \equiv S(a_1, a_2, \ldots a_m | x_1, x_2, \ldots x_n) \quad (1)$$

with $a_i$ : distinct integers and $o \leq a_i \leq n$ $x_j$ : 0 or 1 (switching variable)

is said to be a symmetric switching function when and only when the sum over $X$ equals one of the values in $A$, i.e., $$S(A|X) = 1 \text{ if } \Sigma_i X_i = \text{one of the values in } A = \mathbf{0} \text{ otherwise.} \quad (2)$$

The values in $A$ are commonly called a-numbers. Since it is the sum of the 1-bits in X which are taken, a permutation of the elements in vector X does not change the value in S. Hence, the function can be termed "symmetric."

The A vector is a stream of data $a_1, a_2, \ldots a_m$, while the X vector is an input stream of binary coded data $x_1, x_2, \ldots x_n$. The input data is data which is obtained from generators, from storage, or from other devices on the magnetic medium. For instance, this can be represented by the presence and absence of magnetic bubble domains in a plurality of storage positions. On the other hand, the control data stream representing the vector A is chosen to personalize the function which it is desired to achieve. This will be more apparent as the description proceeds.

The term $\Sigma_i X_i$ represents the sum of the input data bits. Thus, a 1 bit can be thought of as a bubble domain while a 0 bit is the absence of a bubble domain. Accordingly, $\Sigma_i X_i$ is a count of the number of bubble domains in the input data stream. When the count of the number of bubble domains in the input data stream is equal to one of the values in the vector A, the symmetric function has a value of 1. Otherwise, its value is 0.

Symmetric switching functions can be used to synthesize logical functions using a proper selection of the a-numbers. This is how personalization of the device occurs. In fact, the symmetric function is a universal logical connective since the commonly used universal set of logical connectives, for instance, AND, OR, and NOT can by synthesized in a simple manner. For example, $$\begin{array}{ll} \text{AND} & X_1 \wedge X_2 = S(2|x_1, x_2) \\ \text{OR} & X_1 \vee X_2 = S(1,2|x_1, x_2) \\ \text{NOT} & \bar{X}_1 = S(0|x_1). \end{array} \quad (3)$$

The AND function with two inputs $x_1$ and $x_2$ has a vector A that is 2. Only when inputs $x_1$ and $x_2$ are present at the same time will $S(A|X) = 1$. In the case of the OR function, the presence of either input $x_1$ or input $x_2$, or the presence of both of these inputs, will provide an output. Therefore, the $A$ vector is 1 or 2. In the case of the NOT function, the $A$ vector is 0 and the function $S(A|X) = 1$ only when input $x_1$ is not present.

As further examples, the NAND and NOR functions, each of which is a universal logical connective by itself, can be synthesized by symmetric functions at no increase in complexity. In this case, the expressions are given by the following equation:

$$\text{NAND } \overline{X_1 \wedge X_2} = S(0,1|x_1,x_2)$$
$$\text{NOR } \overline{X_1 \wedge X_2} = S\ (0|x_1,x_2). \quad (4)$$

For the case of the NAND function, an output will be provided anytime the AND function is not achieved. Since the AND function is only achieved with both inputs present, the NAND function is achieved when only one input is present or when neither input is present. Hence, $A = a_1,a_2 = 0,1$. In this case, $S(A|X) = 1$ when only one input is present or when neither input is present.

For the NOR function, an output will be provided when anything but the OR function is achieved. Since the OR function is achieved when one or both inputs $x_1,x_2$ are present, the NOR function will be achieved when no input is present. Consequently, $A = 0$ and $S(A|X) = 1$ only when no inputs $x_1,x_2$ are present.

Thus, it is readily seen that any logical function can be provided by establishing the proper A vector. Of course, more complex functions which in conventional circuitry would require a plurality of logical connectives can also be realized using the same simple symmetrical switching structure but having different or the same A vectors. For instance, a binary adder with $x,y$, and $z$ as its input operands and input carry can have its outputs, carry and sum, defined by the following:

$$\text{carry} = S(2,3|x,y,z)$$
$$\text{sum} = S(1,3|x,y,z). \quad (5)$$

For the carry, $A$ is 2 or 3 for the case of three inputs. For the sum, $A$ is 1 or 3 for three data inputs.

Residue Threshold Functions

A subset of symmetric functions is called residue threshold functions. This subset is known in the art and reference is made to an article by I. T. Ho and T. C. Chen, entitled "Multiple Addition by Residue Threshold Functions," which appears in the September 1972 IEEE Computer Conference Proceedings. The residue threshold functions have a very simple relationship to the symmetric switching functions previously described, and will be explained in some detail here.

Given $n$ switching variables $x_1,x_2, \ldots x_n$, a positive integer $m$, a non-negative integer $t$, the residue threshold function is defined as $$R(t,m|x_1, \ldots ,x_n) \equiv R(t,m|X) \equiv t \leq (\Sigma_i\ X_i) \text{ Mod } m \quad (6)$$

where $(\Sigma_i\ X_i)$ Mod $m$ is defined to be the least positive remainder of $(\Sigma X_i)/m$, which is a number between 0 and $(m - 1)$ inclusively.

That is, $$R(t,m|X) = 1 \text{ if and only if } (\Sigma_i\ X_i) \text{ Mod } m \geq t \quad (7)$$

The simple relationship which exists between the symmetric switching function $S(A|X)$ and the residue threshold function $R(t,m|X)$ is the following:

$$R(t,m|X) = S(A|X) \quad (8)$$

with $A$ containing all positive integers, $a_i$'s$(a_i \leq n)$ such that $$t \leq a_i \text{ Mod } m \quad (9)$$

As noted previously, the symmetric function derives its powerful capability of synthesizing any other logical function from the personalization of its $a$-numbers. In practice, the a-numbers are usually more structured than a mere enumeration would indicate, and a common structure is the cyclicity. For example, parity check of the number of 1 or 0 bits in a data stream is a way of testing the reliability of circuitry which performs functions on this data. In this operation, the number of ones or zeros in the data is counted and the parity (even or odd) is an indication of the correctness. Using symmetric switching, the parity of a sequence of bits can be determined merely by knowing whether the number of one bits (bubble domains) in the data sequence is even or odd. The exact number of one bits is immaterial. Thus, instead of specifying $S(1,3,5,7, \ldots |X)$, one needs only to specify $R(1,2,|X)$. This leads to a significantly simplified implementation as will be more apparent in the following discussion.

FIG. 1

FIG. 1 shows a block diagram of a bubble domain system in which many functions are provided on the magnetic medium 10. Medium 10 is any known bubble domain material including garnets and orthoferrites, among others. Located adjacent to magnetic medium 10 is circuitry which performs many functions. For instance, there is a storage area 12 which can for example be provided by a plurality of known bubble domain shift registers. Associated with the storage 12 is a decoder 14 which is used to selectively remove data inputs from storage 12. Decoders of this type are used for selection of data and are well known as can be seen by referring to U.S. Pat. Nos. 3,689,902 and 3,701,125. These prior art patents show the use of both read and write decoders in combination with storage and data generation means for writing and reading of data.

In FIG. 1, the decoder is used to selectively remove data from storage 12 and to direct this data via propagation paths 16 to a symmetric switching device 18. Depending upon the inputs to the symmetric device 18 and its personalization, an output will be provided on propagation path 20. This output will either be a bubble domain or the absence of a bubble domain.

A propagation field source 22 provides reorienting magnetic field H in the plane of magnetic medium 10. As is well known, this can be used in combination with patterns of magnetically soft elements for movement of domains in medium 10. Of course, the propagation field source could be current drivers associated with propagation elements in the form of conductor patterns, also well known for the propagation of domains.

A bias field source 24 provides a magnetic bias field $H_z$ substantially normal to magnetic medium 10, where such bias field is required. Suitable bias field sources include permanent magnets and current carrying coils located around magnetic medium 10.

A control means 26 is used to control the operation of field sources 22 and 24, as well as to synchronize the circuit operations which are performed in magnetic sheet 10. A complete structure combining memory, storage, decoding, writing, and sensing is shown in aforementioned U.S. Pat. Nos. 3,689,902 and 3,701,125. The circuit of FIG. 1 is representative of this type of complete bubble domain system. It has the advantage that the symmetric device 18 is a single structure for performing many functions. Therefore, it can have high density consistent with the density used for the storage 12 and decoder 14. In this manner, the available area of magnetic material 10 is used most efficiently and the number of external interconnections is kept to a minimum.

Realization of Symmetric Switching Functions

This section considers the mechanisms required for the realization of symmetric switching functions using magnetic bubble technology. Implementation based on these mechanisms is derived most generally from the circuit shown in the block diagram form in FIG. 11. That is, the device broadly includes a counter, means for creating a control bubble stream indicating the function to be performed, and a comparison means for comparing the counter output and the control bubble stream.

Figure 2:
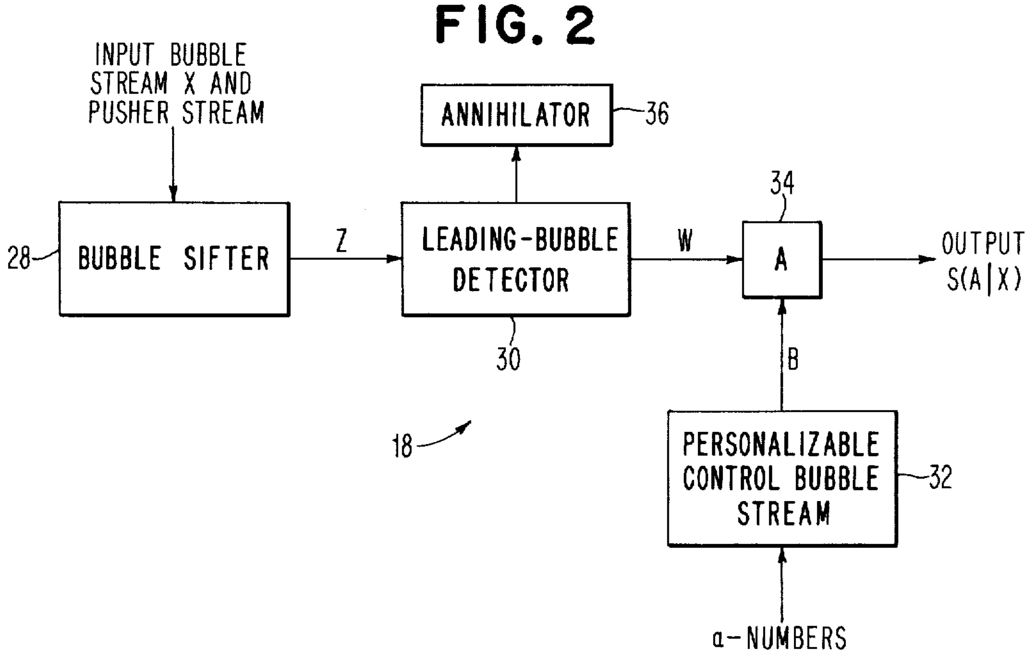
FIG. 2 is a block diagram of a desirable embodiment of a symmetric sw1tch according to the present invention.

FIG. 2 is a block diagram of a circuit which provides a particularly desirable way to perform symmetric switching. It relies on the fact that the position of the leading (first) bubble (1-bit) in the input data stream is related to the total number of bubbles in the input data stream and to the length of the input data stream. In more detail, the symmetric switching device 18 is generally comprised of a bubble domain sifter 28, a leading bubble domain detector 30, a source 32 of a personalizable control bubble stream, and a comparison circuit 34 (generally an AND gate). Although it is not necessarily needed, an annihilator 36 is associated with the leading bubble detector (LBD) 30 in order to destroy those bubble domains which are not needed for their information content.

Briefly, an input bubble domain stream X representing the input data (comprised of the presence and absence of bubble domains) enters the bubble sifter 28 where it is gravitated to result in a new sequence of the input data bits. The sifter basically functions as a counter, since a simple relationship exists between the number of bubble domains (assumed to be 1's) in the input data stream and the position of the leading bubble domain in the bubble stream. The gravitated data stream in sifter 28 is then changed to a data stream Z which propagates to the LBD 30. The leading domain in the input stream Z is captured in detector 30. All other data bits in stream Z are sent to the annihilator 36 or are rerouted to other circuitry. A comparison between the output (W) of LBD 30 and the domains in personalized stream B provides the output of the symmetric device. If a match is made, the output $S(A|X)$ is 1; otherwise, it is 0.

The various concepts associated with symmetric functions and the components shown in FIG. 2 for achieving these functions will now be explained in more detail.

Bubble Sifting

Since the symmetric function is invariant to permutation, the input data stream X, which comprises bubble domains and the absence of bubble domains, can be sifted to result in a new sequence of data Y in which the bubble domains in X have moved toward one end or the other of the data stream. For instance, if X is 0101 with the right-most bit being the leading data bit, than Y would be 1100. Throughout this application, it is assumed that a 1 bit is represented by the presence of a bubble domain while a 0 bit is represented by the absence of a bubble domain.

A bubble domain sifter is easily provided by a plurality of bubble domain idlers, the number of idlers equaling the maximum number of data bits in the input data stream. These input data bits can be directly entered into the idler positions in serial or parallel fashion (explained in more detail with respect to FIG. 10). An input stream of "pusher" domains then pushes the domains in the idlers in a specified direction toward the LBD 30. This means that the bubble domains in the input stream will all be located on one end of the idler positions after the pusher domains have been moved into the idler.

Leading Bubble Detection

As will be remembered, the symmetric switching function is achieved by counting the number of bubble domains in the input data stream. However, a simple relationship exists between the position of the leading bubble domain (right-most bubble domain) in the gravitated data stream Y and the number of domains in either data stream X or gravitated data stream Y. This relationship is $$m = n + 1 - p, \text{ or } p = n - m + 1 \tag{10}$$

where:

$m$ is the number of bubble domains,
$n$ is the data length of X or Y,
$p$ is the position of the leading bubble domain (1 — origin, left indexed) in Y.

In the above, when bubble domains are moved to the left as in the example, one looks at the position of the right-most domain. However, when the input bubbles are shifted to the right, one looks at the position of the leftmost bubble domain. That is, the position of the first bubble domain of data stream X in sifter 28 is noted.

Equation 10 also applies when $m = 0$, for in this case $p$ will be $n + 1$. In practice, gravitated data stream Y is augmented into data stream Z (the output of bubble sifter 28) by appending a 1 bit (bubble domain) to the left of the data stream Y. This accommodates the $m = 0$ case. As will be seen, at the end of the leading bubble detection stage 30, a bubble stream W will be obtained in which there is one and only one bubble domain. All other bubble domains will be rerouted, for instance to annihilator 36. Since all the required information is contained in the position of the leading bubble domain, the other bubble domains following it are not required.

Interaction with Control Bubble Domain Stream

A personalizable control bubble stream source 32 provides a stream of bubble domains and voids such that the positions of the bubble domains in the stream represent the a-numbers. This in turn describes the function which is to be performed by the symmetric device 18. As noted earlier, $A = a_1, \ldots ,a_m$. The A vector is represented by $B = b_0,b_1, \ldots b_n$ such that $b_i = 1$ if $i$ is in $A$
$= \mathbf{0}$ otherwise.

Thus, if there are four data inputs $x_1, \ldots x_4$ and the AND function is to be obtained, $A$ will be 4. Consequently, the personalized bubble stream B will have a bubble domain in its fifth position, corresponding to $b_4$ ($B = 00001$).

By proper timing, the information bit stream W coming out of the leading bubble detector 30 (with bubble/void representing that the leading bubble has/has not been detected) is compared with corresponding components of the control stream B. This compare function is suitably provided by an AND gate 34. At any time during ANDing, a 1 output indicates that the number of 1 bits in X agrees with one of the $a$-numbers. Therefore, $S(A|X) = 1$ if and only if ANDing of the control stream B and the output from the leading bubble detection stage 30 yields a true output (in this case a bubble domain).

The foregoing is explained more fully by the following two examples:

EXAMPLE 1

The input data stream $X$ is
$X = 0101$, with the right hand bit the leading data bit. In the sifter 28, 1 bits (bubble domains) are shifted to the left so that the gravitated data stream is
$Y = 1100$.
The $Z$ data stream is obtained by appending a 1 bit to the left of the $Y$ data stream in order to accommodate the case where no bubble domains are present in the input data stream. Therefore,
$Z = 11100$.
The position of the right-hand most bubble domain in stream $Z$ is in the third position as measured from the right. Therefore, the output of the leading bubble detector 30 is a data stream $W$ given by
$W = 00100$.
The rest of the bits in stream $Z$ have been rerouted, for instance to the annihilator 36.
In this Example, assume that the a-numbers in the vector $A$ are the following:
$A = 0,2,3$
Remembering that the personalized bubble stream based on the $a$-numbers is $B = b_0,b_1, \ldots b_n$ where $b_i = 1$ if $i$ is in $A$ and $= 0$ otherwise, the personalized bubble stream is
$B = b_0,b_1,b_2,b_3,b_4$
$= 10110$.
The comparison unit 34 ANDS together the stream W and the personalized bubble control stream $B$. This is represented in the following way:
$W = 00100$
$B = 10110$
$W$ and $B = 00100$
Since the domain in the stream $W$ matches a domain in the stream $B$, a match is obtained and the function $S(A\ X) = 1$.

EXAMPLE 2

Assume an input data stream $X = 0000$
the gravitated stream $Y$ is then
$Y = 0000$.
Adding a 1-bit to the left of the $Y$ stream yields
$Z = 10000$.
The right-most bubble domain in the $Z$ stream is at the far left ($m + 1$) position. Therefore, the leading bubble detector 30 produces a data stream
$W = 10000$.
If the A vector = 3, the personalized bubble stream shows $b_3 = 1$.
$B = b_0,b_1,b_2,b_3,b_4$
$= 00010$.
When $W$ and $B$ are ANDed together,
$W = 10000$
$B = 00010$,
$W$ and $B = 00000$
yields a mismatch between the leading bubble and the corresponding $b$-number. Hence, the function $S(A|X)$ is 0 in this case.

Figure 3:
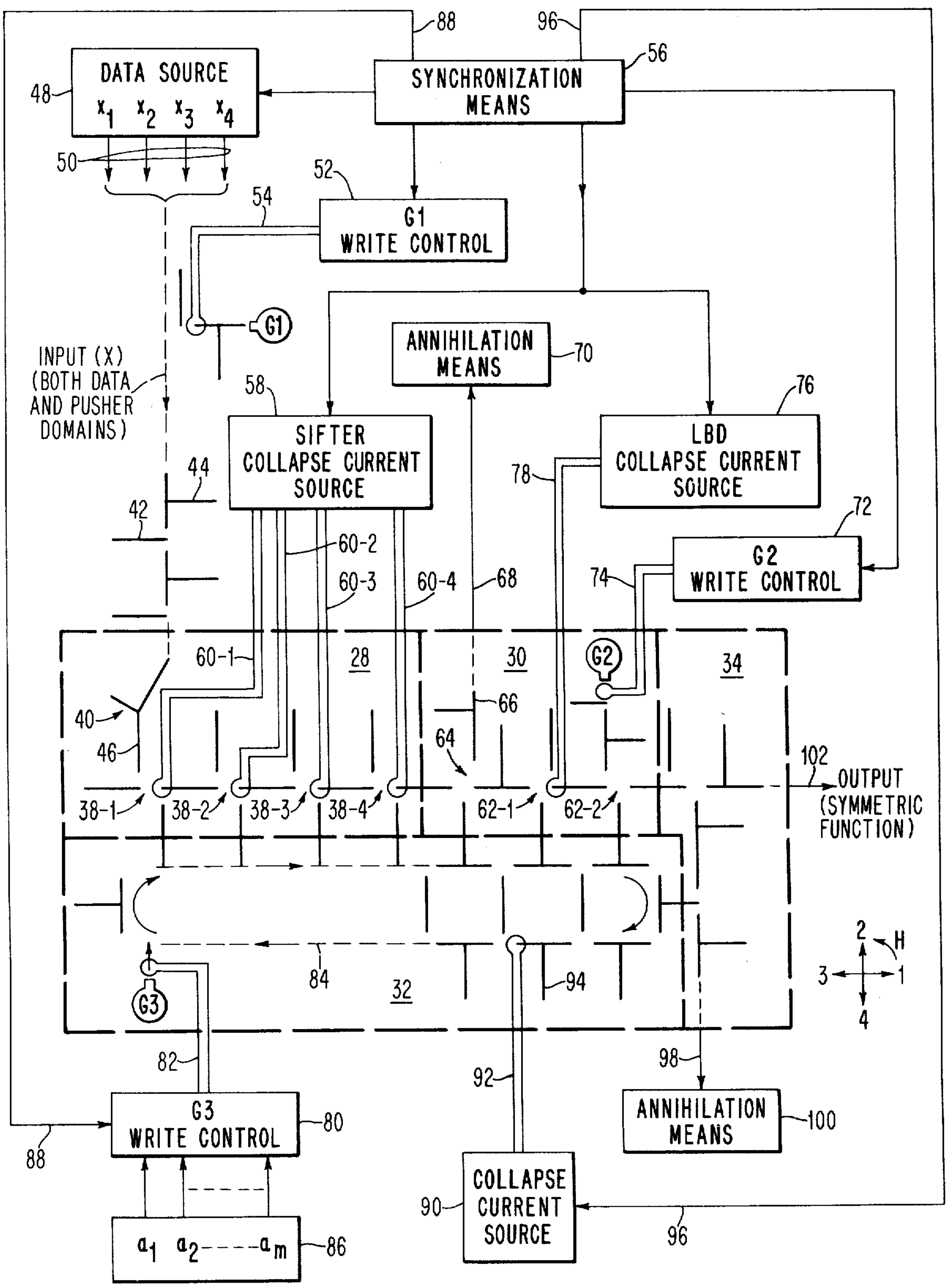
FIG. 3 is a detailed circuit diagram of the symmetric switch of FIG. 2.

Implementation of Symmetric Function — FIG. 3

FIG. 3 shows a detailed pattern for implementing the block diagram structure shown in FIG. 2. In this particular case, patterns of magnetically soft elements, such as permalloy, are adjacent to the magnetic medium 10 (not shown) for manipulation of bubble domains therein. The particular geometries of the soft magnetic elements are those known in the art and will be recognized as such.

In general, the symmetric switching device comprises four separate components: sifter 28, leading bubble detector 30, means 32 for creating the control bubble domain stream, and comparison means 34 (AND GATE).

Bubble Sifter 28

The bubble sifter 28 is used to separate zero bits from one bits in the input data stream X. This is done because the position of the leading 1 bit in the input data stream is a measure of the number of 1 bits in this data stream, which in turn is used in the performance of the function desired. The bubble sifter 28 comprises N bubble domain idlers 38-1, 38-2, 38-3, and 38-4. The number of idlers is chosen to be the number of data bits in the input stream X, although, as will be more apparent later, this symmetric device will accommodate smaller or larger data streams. Associated with the first idler 38-1 is an input structure 40, comprised of T and I bar elements such as 42 and 44, and a modified Y bar 46. The idlers within sifter 28 are slightly offset in such a way that bubble movement toward the right is favored. However, a bubble in any particular idler will not move to the right unless all the idler positions to its left are filled with bubble domains and there is a bubble domain entering the first idler from input channel 40.

A data source 48 provides the data bits $x_1,x_2,x_3,x_4, \ldots$ which comprise the X data stream. Data source 48 could be a combination of storage and decoder units as shown in FIG. 1, or any circuitry located on the magnetic medium 10 which is sending information to the symmetric switching device 18. The data $x_1,x_2, \ldots$ propagates in the direction of arrows 50 to enter the input channel 40.

Also associated with the input is a bubble domain generator G1 which provides magnetic bubble domains during each cycle of rotation of the in plane propagation field H. Generator G1 has associated therewith G1 WRITE CONTROL 52 which comprises a current source and a conductor loop 54. Current pulses in conductor loop 54 will collapse domains produced by generator G1. Thus, control streams of domains from G1 will be able to enter input channel 40.

A synchronization means 56 provides inputs to the data source 48 and G1 WRITE CONTROL 52. As will be more apparent later, the synchronization means controls operation of the data source in G1 WRITE CONTROL 52 such that $n$ bits $x_1, \ldots x_n$ enter input channel 40, after which $(n + 1)$ pusher domains from generator G1 enter input channel 40.

A sifter collapse current source 58 is used to provide currents in conductors 60-1, 60-2, 60-3, and 60-4. These conductors 60-1, . . . are associated with idlers 38-1, . . . 38-4, respectively. Currents in the conductors 60-1, . . . produce magnetic fields in each of the idlers in the sifter to collapse any domains existing therein. The source 58 receives an input from synchronization means 56 in order to collapse domains in the idlers 38 after an operation has been performed by symmetric device 18.

Leading Bubble Detector 30

The leading bubble detector (LBD) 30 is used to detect the leading domain of the gravitated data stream in the sifter 28. LBD 30 is comprised of two idlers 62-1 and 62-2, and input propagation elements generally designated 64. Modified T bar 66 is part of a propagation path generally designated 68, which leads to an annihilation means 70. As will be apparent later, the leading bubble domain in the gravitated domain stream in the sifter will be trapped in idler 62-1, while all other information bits of the data stream will propagate to element 66 and then via path 68 to annihilation means 70.

A bubble domain generator G2 provides a bubble domain for movement into indler 62-2 at the beginning of each operation of the symmetric device 18. This is the "resident" bubble domain, which will be described in more detail later. G2 WRITE CONTROL 72 is a current source for providing currents in conductor loop 74. Current in loop 74 will produce a magnetic field to destroy domains produced by generator G2 as propagation field H rotates. Thus, domains can be selectively placed in idler 62-2 at the beginning of each operation of symmetric device 18. G2 WRITEE CONTROL 72 receives an input from synchronization means 56 to initiate the placement of a domain in idler 62-2.

A LBD collapse current source 76 is connected to a conductor 78 which is associated with idler 62-1. Current in conductor 78 produces a magnetic field for clearing of a leading bubble domain in idler 62-1 at the end of each operation of symmetric device 18. As will be noted, source 76 is connected to synchronization means 56 by the same means used to connect synchronization means 56 to sifter collapse current source 58. This means that all domains in the sifter and the leading bubble detector will be cleared at the same time. Additionally, all of the conductor loops used for collapsing domains in the sifter and in the leading bubble detector will collapse domains when these domains are in positions determined by direction 3 of the propagation field H. In fact, the conductor loops used for collapsing domains may be combined into one single loop.

Personalization Means 32

The means 32 for creating a personalizable control bubble stream generally comprises a bubble domain generator G3 of a type which produces a domain during each cycle of rotating drive field H. Of course, any type of domain generator can be used. G3 WRITE CONTROL 80 is connected to conductor loop 82. Current in loop 82 produces a magnetic field for collapsing domains produced by generator G3. Thus, a control stream of bubble domains and voids can be entered into a propagation means generally designated 84. Propagation means 84 is shown as a closed loop shift register, although other circuit patterns will work as well. It is only important that the control bubble stream in the propagation means 84 be brought to a position where an interaction can occur with a domain coming from the leading bubble detector 30.

A means 86 provides the $a$-numbers $a_1, a_2, \ldots a_m$ which determine the personalized bubble stream B for each operation of the symmetric device. A conductor line 88 from synchronization means 56 is also provided to G3 WRITE CONTROL 80 in order to synchronize the generation and entry of the personalized bubble control stream in propagation means 84.

A collapse current source 90 is connected to a conductor loop 94 which intercepts the propagation path 84 in the area of one of the poles of T bar 94. Current in loop 92 is used to collapse domains in the personalized bubble stream B in order to clear this portion of the device. A conductor 96 from synchronization means 56 provides an input to collapse current source 90 for synchronizing its clear operation with that of the other sources used to clear domains from symmetric device 18. Since only a single conductor 92 is provided for clearing domains from propagation means 84, current will have to exist in loop 92 for a period of time in order to ensure that all domains in the personalized control stream are destroyed. The synchronization means ensures that all domains in this control stream are destroyed.

Comparison Means 34

The comparison means generally comprises an AND gate for comparing the resident domain moved from idler 62-2 of leading bubble detector 30 with a domain in the control bubble stream B. The symmetric function has an output of 1 if there is a bubble domain in the control bubble stream at the same time the comparison is made with the bubble domain ejected from idler 62-2.

Comparison means 34 is conveniently shown in this case as an AND gate. It comprises propagation elements for moving a resident domain from idler 62-2 to a position where it will interact with domains in the control bubble stream for comparison purposes. Additionally, the propagation elements in the comparison means 34 are used to move domains in the direction of arrow 98 to an annihilation means 100 as an alternate path to the output path 102. Consequently, when a domain is present in the control bubble stream to cause a deflection of the resident domain from idler 62-2, the symmetric function will be indicated by an output in the direction of arrow 102. Otherwise, the resident domain will be propagated along a direction indicated by arrow 98 to the annihilation means 100.

Operation of the Symmetric Switching Device

FIGS. 4–9 describe the operation of the symmetric switching device based on the data input X wich is 0101. These figures show the loading of the input domains, sifting of these domains, leading bubble detection, and comparison. In FIGS. 4–9, many of the components shown in detail in FIG. 3 are omitted for ease of illustration. Also, the magnetic medium 10 is not shown.

Figure 4:
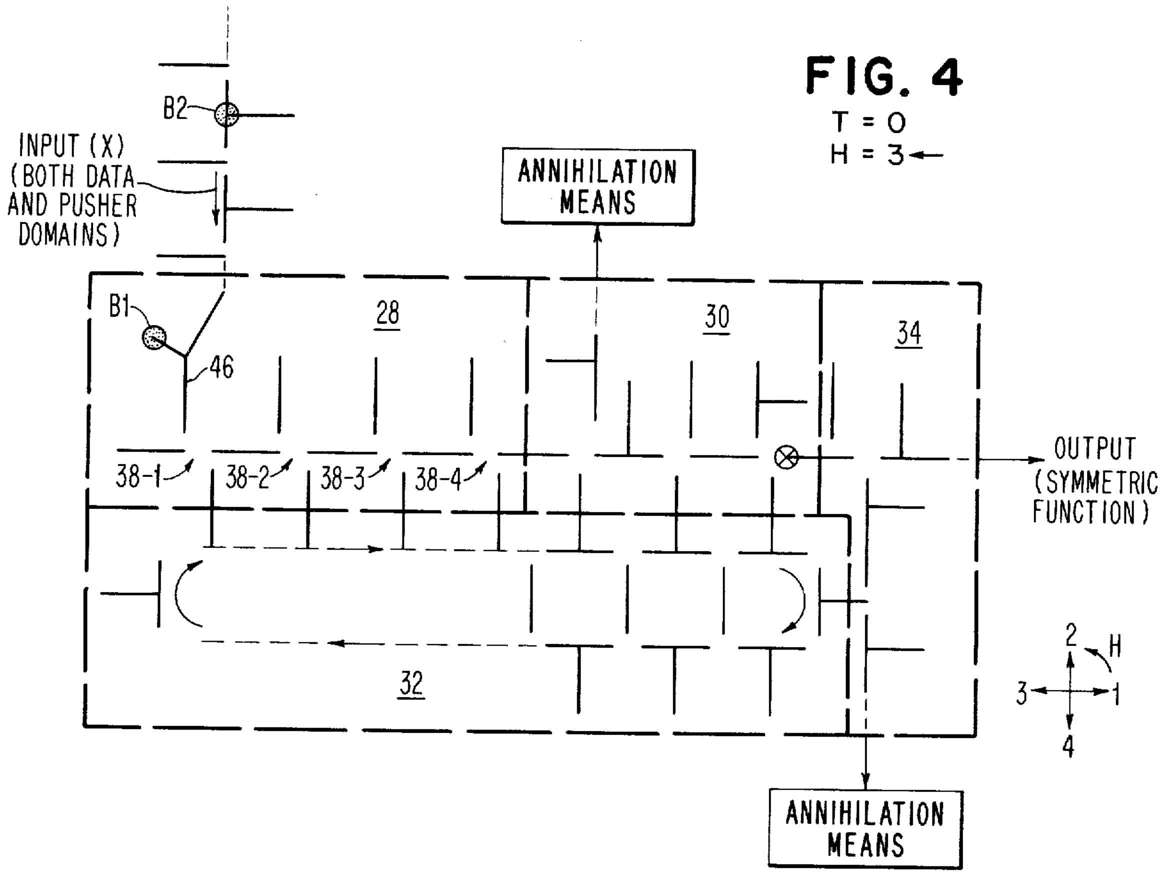
FIGS. 4–9 illustrate the operation of the symmetric switch of FIGS. 2 and 3, at various times during the performance of any desired function.
Figure 5:
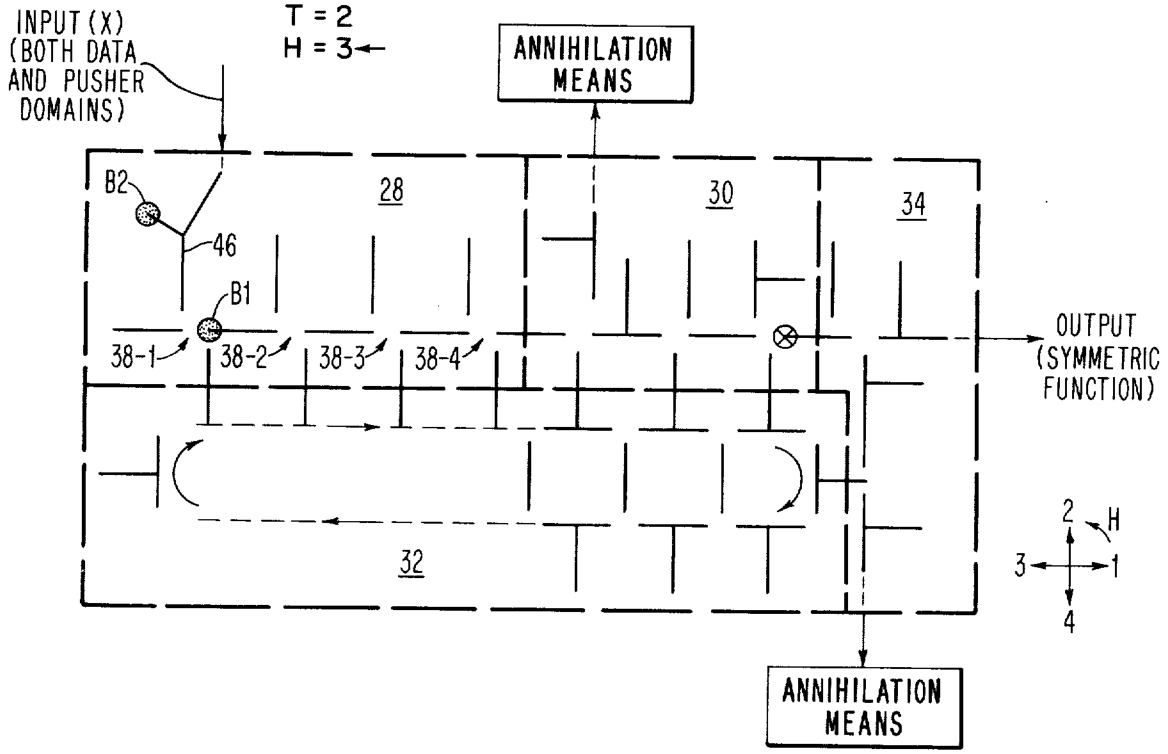

FIG. 4 illustrates the case at time T = 0. The symmetric device has been cleared of all data, using the sifting collapse current source 58, the LBD collapse current source 76, and the collapse current source 90.

As will be remembered, the idlers 38-1, . . . 38-4 in sifter 28 are slightly offset to favor bubble movement toward the right. However, a bubble domain in any idler will not move to the right unless all the idler positions to its left are filled with domains and there is a domain entering at the input channel 40 trying to push all the bubbles in the sifter. The net effect is that voids (0 bits) will skip all proceeding bubbles. Consequently, the input stream X will, after n cycles of propagation field H, become the n-bit stream Y residing in the sifter. This will have m bubbles juxtaposed with $(n - m)$ voids to their right.

This is illustrated for an input data stream X comprising the bits 0 (no bubble) 1 (bubble) 0 (no bubble) 1 (bubble). The input 1 bits will be represented by stippled circles. At the time the data is entered into sifter 28, or before that time, a "resident" bubble domain is entered into idler 62-2 of leading bubble detector 30. The resident bubble domain is represented by a circle with a cross in it. The resident bubble domain is produced by generator G2.

The data input X is 0101 with right-most position being the leading position. The bubbles in the input data stream are represented by the stippled circles, the resident bubble by a circle with a cross in it, and the pushing bubbles will be represented by circles.

FIG. 4 shows the placement of data and the resident bubble at time T = 0 with a propagation field in direction 3. At time T = 1, the propagation field has moved one cycle and is in direction 3 again. A first data bubble B1 has entered the left-most idler 38-1 and at the input channel is a void representing the second bit (0).

FIG. 5

At T = 2, the propagation field H has moved through another cycle and is again in direction 3. The first data bit B1 remains in idler 38-1 because the second data bit is a 0. Therefore, data bit B1 will not be pushed to the right. Thus, it can be said that the second bit (void) has skipped B1 preceding it and now resides at the second idler 38-2.

FIG. 6

Figure 6:
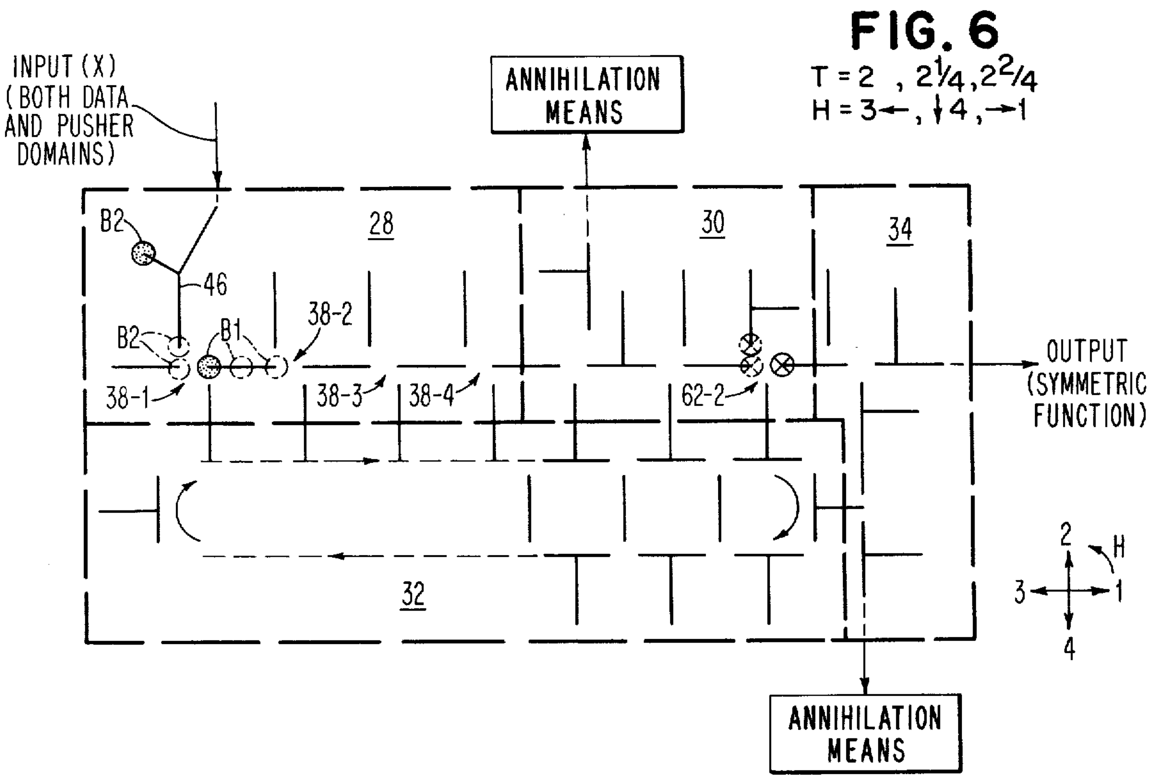

FIG. 6 shows the movement of data bubbles B1 and B2, and the movement of the resident bubble in idler 62-2 for times T = 2, 2 ¼, and 2, 2/4. At these times, propagation field H is in direction 3, direction 4, and direction 1, respectively. As will be apparent, during these time periods, the third data bit B2 will push the first data bit B1 to idler 38-2.

Data bubble B2 moves downwardly along modified Y bar 46 as the propagation field H rotates from direction 3 to direction 4. At T = 2 ¼, data bubble B2 moves downwardly along Y bar 46 and repels data bubble B1 toward the right, moving it temporarily out of synchronization with the propagation field H. At T = 2 2/4, H is in direction 1 and the first data bubble B1 is attracted to position 1 of idler 38-2. Thus, B1 is resynchronized with propagation field H.

Between the times T = 2 2/4 and T = 4, propagation field H has made 1 ½ revolutions. During this time, data bubbles B1 and B2 rotate in idlers 38-2 and 38-1, respectively. Since the last data bit in the input stream X is a zero, data bubbles B1 and B2 remain in the idlers and are trapped there.

After the data bits in the X stream have passed, generator G1 produces $(n + 1)$ pusher domains. These domains are indicated by circles and are used to move the data in sifter 28 to the leading bubble detector 30. This operation is under control of synchronization means 56.

FIG. 7

Figure 7:
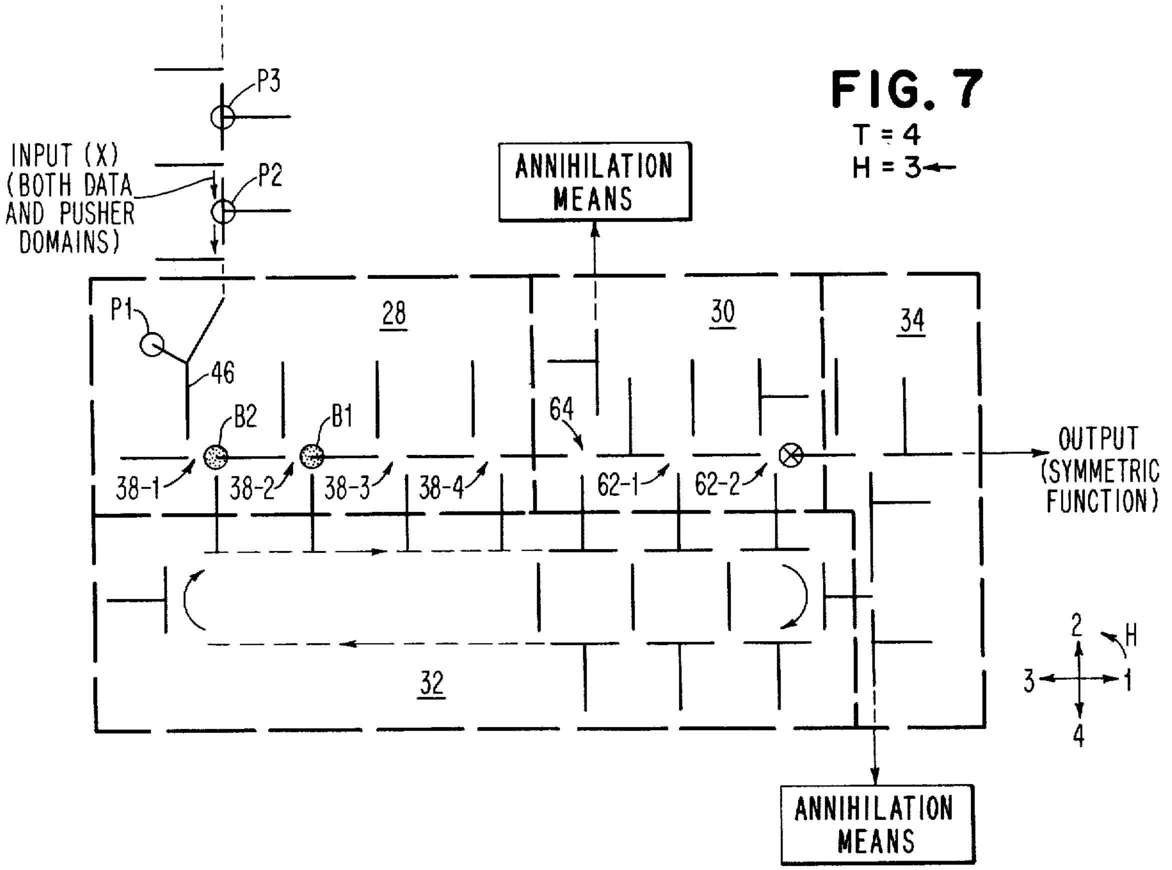

FIG. 7 shows the arrangement of data bits B1 and B2 in sifter 28, and the position of the first pusher domain P1 on modified Y bar 46. FIG. 7 illustrates the case for time T = 4, with propagation field H in direction 3.

Data bubbles B1 and B2 reside at idlers 38-2 and 38-1, respectively. The two voids in the input data stream X can be thought of as having skipped bubbles B1 and B2 and advanced to the two idlers 38-3 and 38-4. The first pushing domain P1 is located on modified Y bar 46 and ready to enter the first idler 38-1.

In this particular example, it requires two more cycles of propagation field H to completely fill shifter 28 with bubble domains and two additional cycles of field H for the leading data bubble B1 to be pushed out of sifter 28 and propagated to the center idler 62-1 of leading bubble detector 30.

FIG. 8

Figure 8:
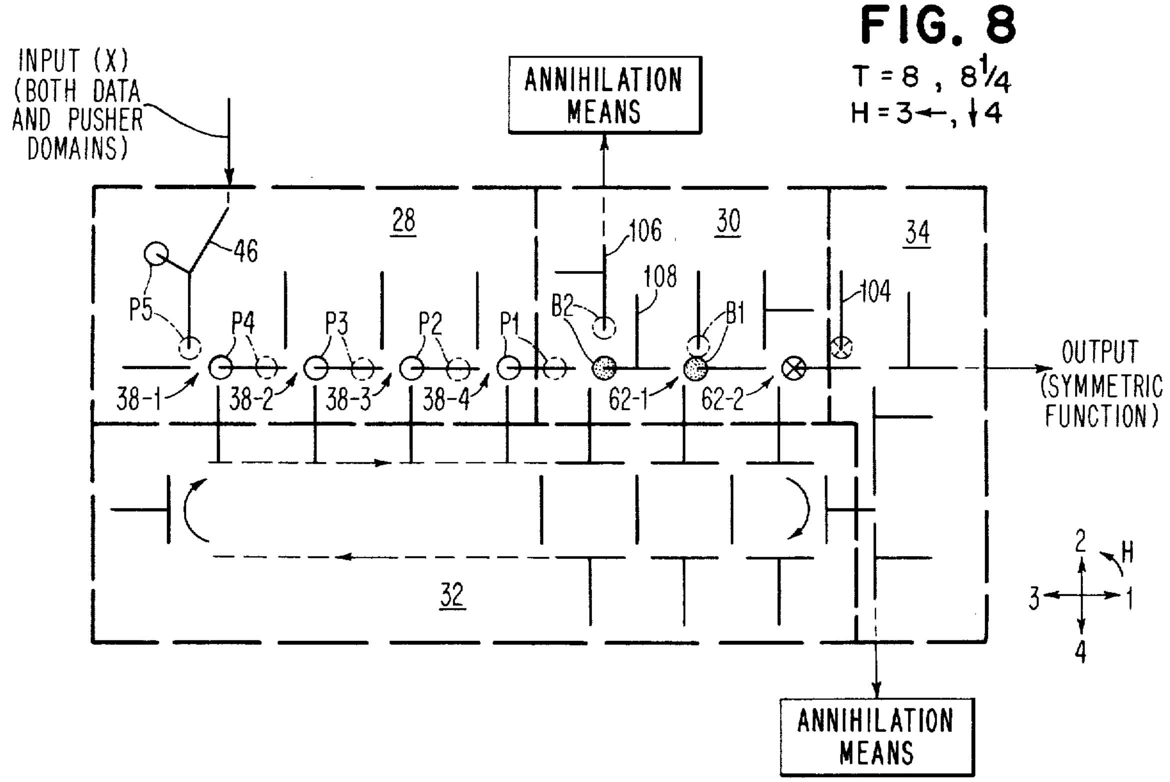

FIG. 8 illustrates the situation at times T = 8 and T = 8 ¼. At these times, propagation field H is in directions 3 and 4, respectively.

FIG. 8 illustrates the movement of the data bubbles B1 and B2, as well as the movement of pusher domains P1, P2, P3, P4 and P5. It is assumed that four cycles of the propagation field H have occurred since the situation shown in FIG. 7. Accordingly, four pusher domains P1 – P4 have entered sifter 28 and the leading data bubble B1 is in idler 62-1 of leading bubble detector 30.

As time advances from T = 8 to T = 8 ¼, the presence of the first data bubble B1 in idler 62-1 causes the resident bubble in idler 62-2 to move to position 4' on I bar 104 in comparison means 34. Data bubble B2 moves upwardly to position 4' on T bar 106 in detector 30. Data bubble B2 then goes to an annihilation means 70 (shown in FIG. 3). Thus, when leading data bubble B1 is trapped in idler 62-1, all following data bubbles will be diverted upward to annihilator 70. Consequently, during the whole operation one and only one bubble domain will leave detector 30 and enter comparison means 34.

In the design of leading bubble detector 30 and comparison means 34, the particular propagation structures are designed so that the presence of the first data bubble in idler 62-1 will cause the resident bubble in idler 62-2 to move to the comparison means 34. Additionally, the first data bubble will remain in idler 62-1, while all other domains will be moved upwardly to annihilation means 70. That is, position 4' on T bar 106 is a more favorable attraction for the domain B2 than is position 4 on T bar 108. Of course, this is due to the repelling force of domain B1 in idler 62-1.

FIG. 9

Figure 9:
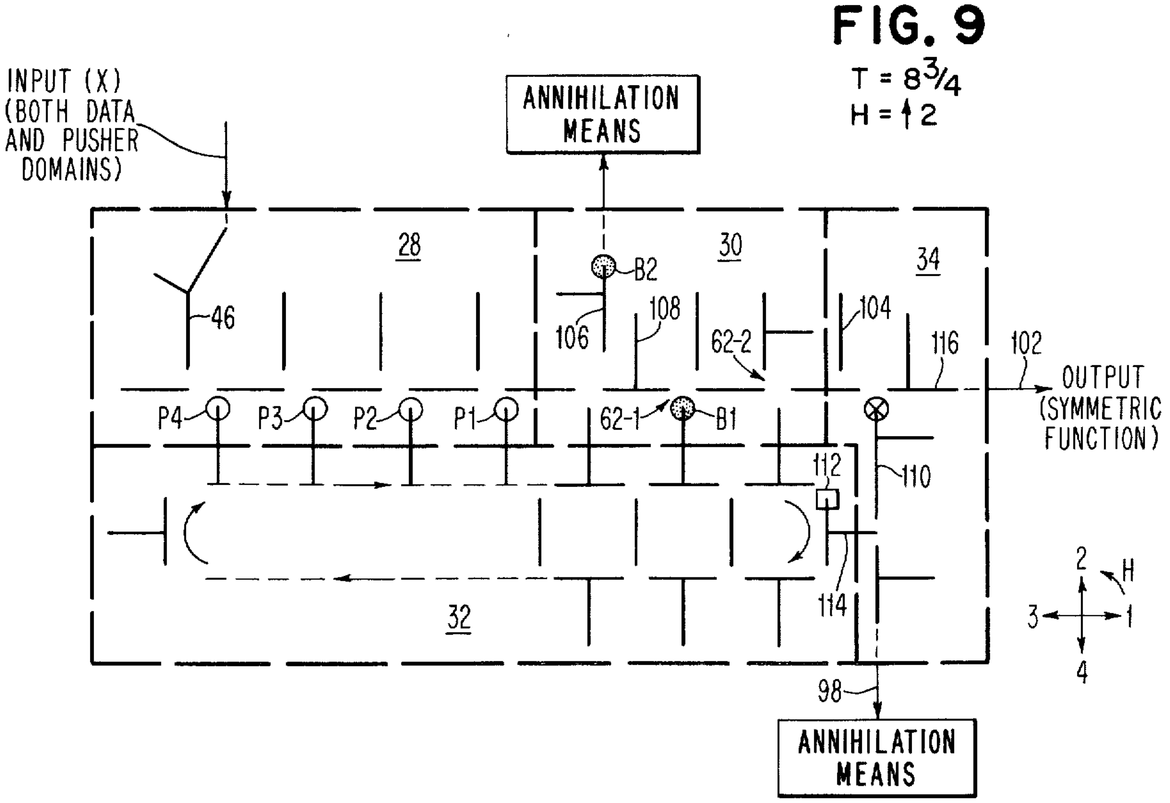

FIG. 9 shows the situation at time T = 8 ¾. At this time, propagation field H is in direction 2. One half cycle of propagation field H has occurred since the situation shown in FIG. 8. At this time, the resident domain is located at pole position 2 on modified T bar 110 in comparison means 34. If, at this instance, there is a bubble domain in the control bubble stream located at the position indicated by the small square 112 on T bar 114, the resident bubble domain in comparison means 34 will be forced to move to position 3′ on modified T bar 116 at time T = 9 (H in direction 3). As field H continues to rotate, the resident domain will move in the direction of arrow 102, thus indicating that the symmetric function is true.

If no domain in the control bubble stream were present in square 112 at time T = 8 ¾, the resident bubble domain will move downwardly in the direction of arrow 98 in comparison means 34, and will propagate to annihilation means 100 (FIG. 3). Consequently, the upper portion of comparison means 34 behaves as an AND gate.

The control stream bubbles, which are used to interact with the resident bubble domains repelled by the leading data bubbles in successive cycles, are produced in accordance with the $a$-numbers. That is, generator G3 produces a stream of control bubbles in accordance with the function to be performed, under control of synchronization means 56.

As an example, if the OR function were to be performed with the data inputs illustrated, the control bubble stream $B = b_0,b_1,b_2,b_3,b_4$ would be B = 01111. This corresponds to a void and then four bubbles.

Timing Requirements

In general, with an n-bit (bubble/void) input X having $m$ bubbles, the critical ANDing time $T_a$ ($T_a$ = 8 ¾ in the case described above) between the resident bubble domain and the control bubble stream is given by the following expression:

$$T_a = n + (n - m) + 2 + 3/4 = 2n - m + 2\ 3/4. \qquad (11)$$

In this equation, n cycles of propagation field are required to load and sift data bubble domains and voids into sifter 28, $(n - m)$ cycles of propagation field H are required to fill sifter 28, and two more cycles are required to propagate the right-most bubble domain in the sifter to idler 62-1 of detector 30. Finally, three-fourths of a cycle of propagation field H is required to move the resident bubble domain to position 2 on modified T bar 110 of comparison means 34.

If the resident bubble domain cannot be found at position 3′ on modified T bar 116 in comparison means 34 before or at $$T_a|_{m=0} + 1/4 = 2n + 3, \qquad (12)$$

then the symmetric function is false. In other words, the operation time excluding initialization of this device is $2n + 3$ propagation field cycles.

Parallel Input Operation

Figure 10:
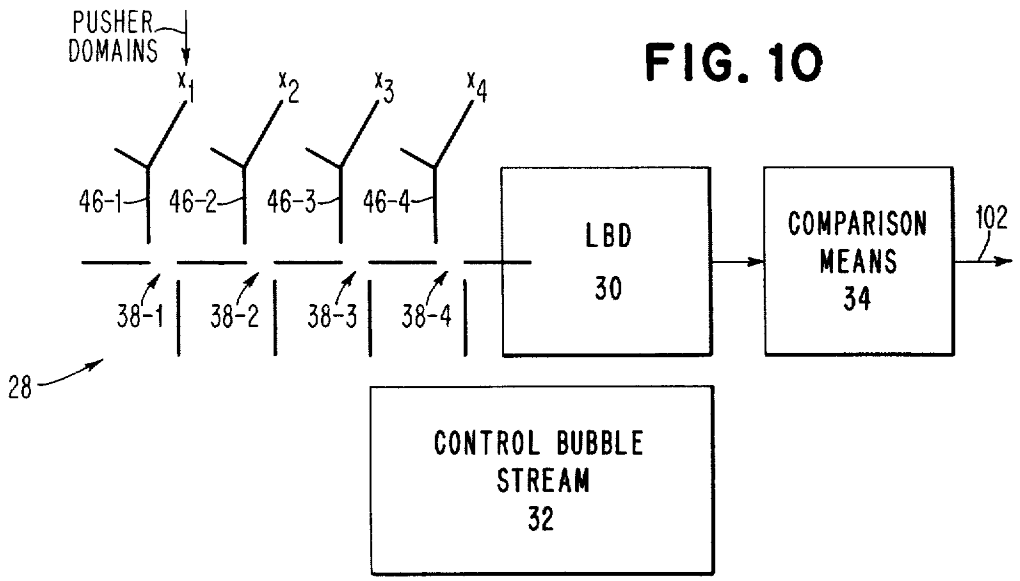
FIG. 10 shows a symmetric switch of the type shown in FIG. 3, but with means for accepting parallel data input.

FIG. 10 shows a modified sifter 28 used to provide parallel input operation. This contrasts with the bit-serial implementation described with reference to FIG. 3.

The structure of FIG. 10 is very similar to that of FIG. 3 and much of it is shown in block diagram form for ease of illustration. The essential part of sifter 28 is the plurality of modified Y bars 46-1, 46-2, 46-3 and 46-4 which are now associated with each of the idler positions 38-1, 38-2, 38-3, and 38-4, respectively. This means that input data bits $x_1,x_2,x_3$, and $x_4$ can be directly entered into different idlers of sifter 28, rather than having to be entered in only one idler and then moved.

In FIG. 10, the pusher domains are provided in the same manner as in FIG. 3 and enter idler 38-1 via Y bar 46-1.

Although many of the associated components, such as the various generators and collapse current sources, are not shown in FIG. 10, it should be understood that such components are provided in the same manner as they were provided in FIG. 3.

The parallel input operation illustrated by FIG. 10 is used to gain speed of operation. Because the sifting can be performed during the pushing time, increased speed is provided. No data bubble in the X stream can leave sifter 28 until all idlers in the sifter have been filled. Assuming that the pushing bubbles are allowed to enter at the left-most input channel (i.e., via Y bar 46-1), the critical ANDing time $T_a$ for the parallel input case is given by $$T_a = 1 + (n - m) + 2 + 3/4 = (n - m) + 3\ 3/4 \qquad (13)$$

Hence, the operation time for parallel input operation is $(n + 4)$.

Equation 13 is easily understood by comparison with equation 11. In the parallel input case the loading and sifting is done during one cycle of propagation field, rather than $n$ cycles of propagation field as is the case when the input bits are entered serially. The remaining terms of equation 13 are the same as those in equation 11; that is, $(n - m)$ is the number of cycles required to fill the sifter, the number of cycles required to move the first bubble domain to idler 62-1 is 2, and the number of cycles required to move the resident bubble domain to a comparison position in means 34 is ¾ cycle.

Parity Cycle

Previously, residue threshold functions $R(t,m|X)$ have been described and their relationship to the symmetric switching function $S(A|X)$ has been shown. Utilization of these residue threshold functions leads to a very simple way to check the parity of an input data stream. In order to find the parity of a sequence of bits, it is only necessary to know whether the number of ONEs in the sequence is even or odd. The exact number of ONEs is immaterial. Thus, the function is $R(t,m|X)$ with $t = 1$, $m = 2$.

When the number of ONEs in the input stream is an even number, $R(1,2|X)$ is zero since this function is one if and only if the least positive remainder of $(\Sigma X_i)/m$ is greater or equal to $t = 1$ (see Equation 7). Accordingly, the control bubble stream B need only consist of a tight loop with alternating bubble domains and voids. Since the leading bubble detector 30 provides an output indicative of the number of ONEs in the input stream, the output of comparison means 34 will be a bubble or a void depending upon whether the number of domains in the input data stream X is odd or even.

Variable Length Input Data Streams

Generally, the number of idlers $n$, in the bubble domain sifter 28 is chosen to be equal to $m$, the number of input data bits. However, the embodiment of FIG. 2 can be used as long as the number of bubble domains in the input stream X does not exceed the number of idler positions.

When the input stream is shorter than the number of idler positions the symmetric switching device of FIG. 2 will work as previously explained since $(n + 1)$ pusher domains are utilized. That is, $(n + 1)$ pusher domains will always move the leading bubble domain in the data stream to the idler 62-1 of leading bubble detector 30.

In the case where $m$, the number of data bits in the input data stream, exceeds $n$, the number of idlers provided, the symmetric switching device can still be used. No change at all is necessary if:

1. the total number of ONEs (bubble domains) is known not to exceed the number of idlers provided, and
2. after the initial bits (n) are entered, the input stream enters the idlers one bit at a time.

For situations in which either or both of conditions 1 and 2 do not hold, the input bits are arranged into groups of K bits (K number of idlers in the sifter). After the initial K bits are entered, the input stream enters the idler one bit at a time, from the left.

Figure 11:
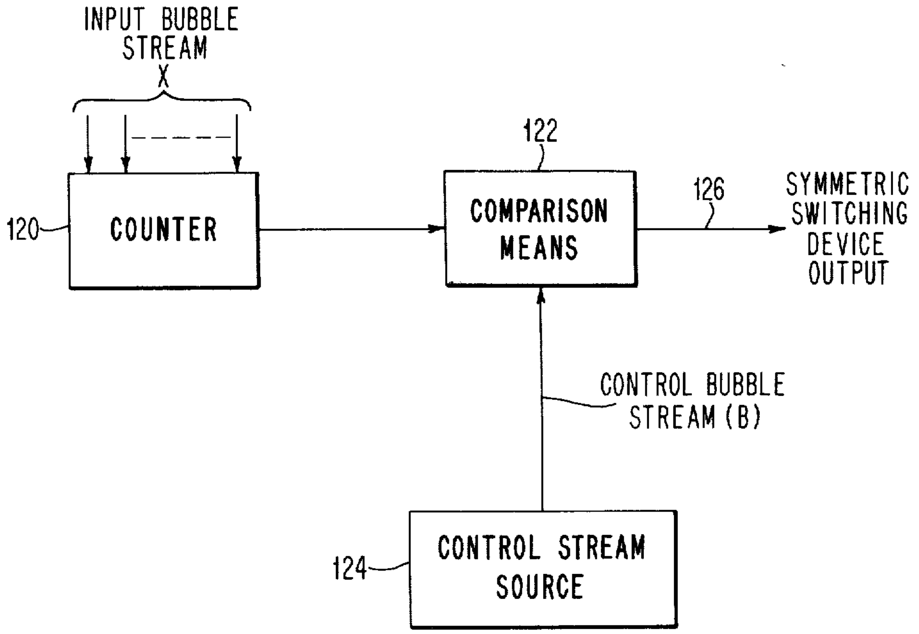
FIG. 11 is a block diagram of a symmetric switching device in its most general form, using magnetic bubble domains.

Generalized Symmetric Switching Device — FIG. 11

FIG. 11 shows a generalized block diagram for a symmetric switching device using magnetic bubble domains. In this device, a counter 120 receives the input data stream X which comprises bubbles and voids, as in the previous embodiment. The counter determines the number of bubbles in the input data stream and the output of the counter is sent to a comparison means 122. As in the case of FIG. 2, the comparison means compares the counter output with a control bubble stream B produced by the control stream source 124. Depending upon whether or not the comparison is true, the symmetric switching device output in the direction of arrow 126 will be either a bubble or a void.

FIG. 11 represents the general case. The symmetric switching function relies upon counting the number of bubble domains in an input data stream. In the particular case of FIG. 2, the counter portion was achieved using a bubble sifter and leading bubble detector. The number of bubble domains in the input data stream is related to the position of the leading bubble domain in the sifter output data stream. Therefore, the embodiment of FIG. 2 is a very convenient way of providing the counter function. Moreover, it represents a very desirable embodiment for the generalized circuitry shown in FIG. 11.

The basic operation of the generalized circuit of FIG. 11 is the same as that previously described with respect to FIG. 2 and will not be described further here.

Figure 12:
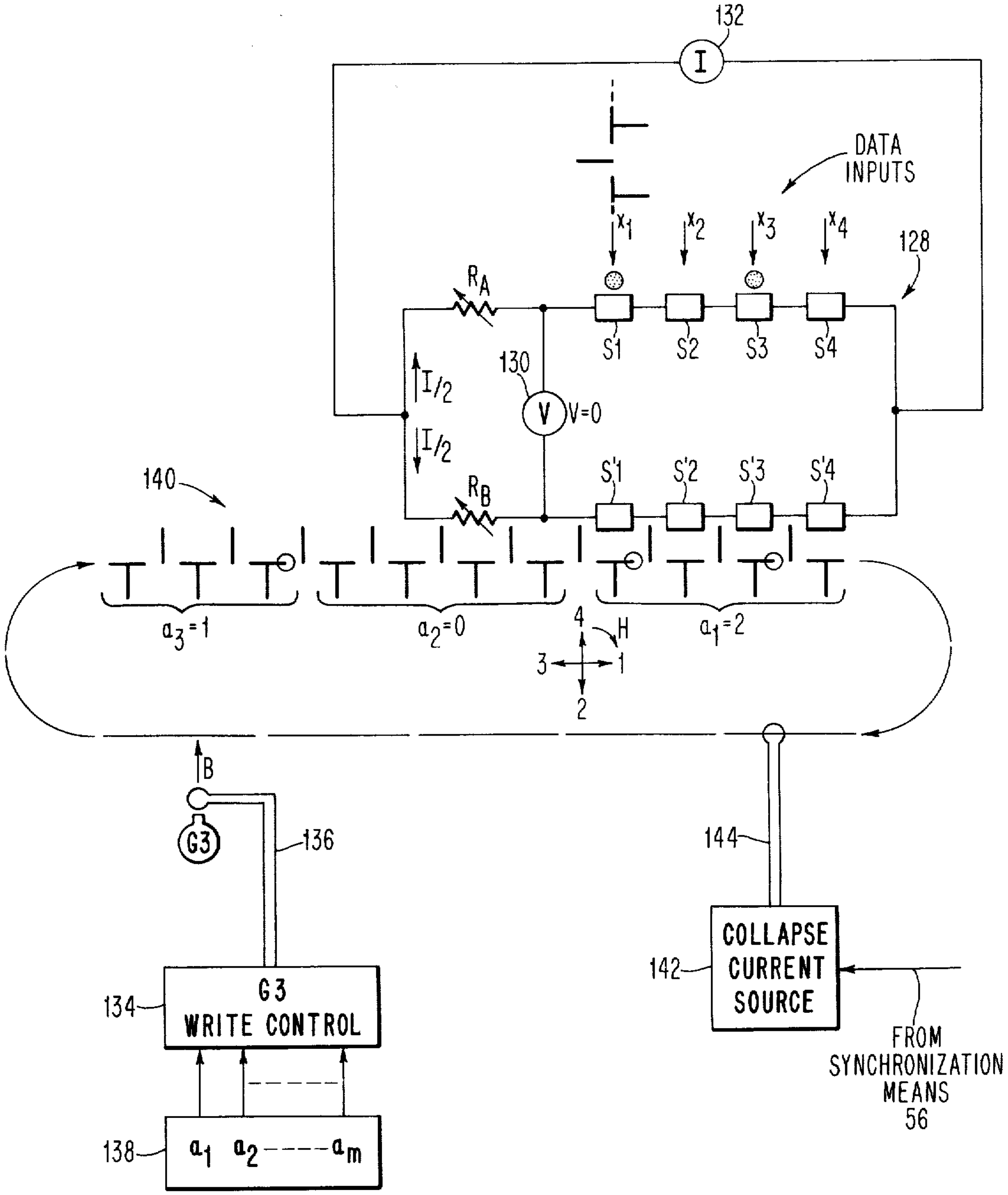
FIG. 12 is another embodiment of the general symmetric switching device of FIG. 11.

Embodiment of FIG. 12

The embodiment of FIG. 12 combines the counter and the comparison means of FIG. 11. That is, the structure designated 128 comprises circuitry for performing the counting and comparison functions. Circuitry 128 is generally a bridge circuit in which the data inputs $x_1$, $x_2$, $x_3$, and $x_4$ propagate to sensing elements S1, S2, S3 and S4. These data inputs stay in the presence of the sensing elements S1-S4 during the entire comparison cycle.

The other portion of bridge network 128 comprises further sensors S′1, S′2, S′3, and S′4. The control bubble stream is led to positions in proximity to the sensors S′1-S′4. As will be more fully apparent later, when the number of bubble domains in the data input $x_1$–$x_4$ in flux coupling proximity to the sensors S1–S4 is the same as the number of bubble domains in the control bubble stream in flux coupling proximity to the sensors S′1–S′4, the voltage developed across the null detector 130 will be zero. This will indicate that the particular function determined by the control bubble stream is met.

Current source 132 produces current I which splits into two equal currents I/2, if variable resistors $R_A$ and $R_B$ are equal, and if the sum of the resistances of sensors S1-S4 is the same as the sum of the resistances S′1–S′4. The resistances of magnetoresistive sensors S1–S4 and S′1–S′4 change when a bubble domain is in flux-coupling proximity to them. Therefore, the voltage across the combination S1–S4 or S′1–S′4 changes when bubble domains are in flux-coupling proximity to any of the sensors. As is well known in bridge circuits, null detector 130 will indicate zero voltage when the voltages across opposite branches of the bridge are the same. This will occur when the number of bubble domains in the control bubble stream in flux coupling proximity to sensors S′1–S′4 is the same as the number of bubble domains in the input data stream X in flux-coupling proximity to sensors S1–S4. Hence, a count and comparison will be simultaneously made by structure 128.

In FIG. 12, $R_A$ and $R_B$ are variable, so that current adjustments can be made if the sum of the resistances S1–S4 is not the same as the sum of the resistances S′1–S′4.

As in previous embodiments, the control bubble stream B is produced by a generator G3. Associated with generator G3 is G3 write control 134 which provides current in control loop 136. Unit 138 provides inputs to write control 134 in accordance with the a-numbers. The structure for providing the control bubble domain stream is the same as that used previously.

Propagation circuit 140, shown here as comprising T and I bars, moves domains in the control bubble stream past sensors S′1–S′4, under control of the propagation field H.

The collapse current source 142 provides currents in control loop 144 in order to collapse domains in the control bubble stream B. An input to collapse current source 142 to trigger its operation is provided from a synchronization means, such as means 56 of FIG. 3.

The data inputs stay in proximity to sensors S1–S4 for a maximum of $(n+1)$ comparison cycles. For instance, if n inputs are present, the control bubble stream is comprised of a maximum of $(n + 1)$ different parts. Any given part of the control bubble stream may have a specified number of bubble domains between 0 and $n$, inclusively. For instance, if $A = 2, 0, 1$, then the first part has two bubble domains ($a_1 = 2$), the second part has no bubble domains ($a_2 = 0$) and the third part has one bubble domain ($a_3 = 1$). This is the particular example illustrated in FIG. 12. Accordingly, there are two control bubble domains indicated by circles in the $a_1 =$ 2 portion of control bubble stream which is opposite the sensors S′1–S′4. Since there are two bubble domains ($x_1$ and $x_3$) in the data input stream in this example, null detector 130 will indicate a zero voltage when the $a_1 = 2$ portion of the control bubble stream is located opposite sensors S'1-S'4.

In FIG. 12, the next portion ($a_2 = 0$) of the control bubble stream B has no bubble domains in it. The following portion ($a_3 = 1$) of the control bubble stream has one bubble domain in it. As will be noted, the positions of the bubble domains in the control bubble stream and in the input bubble stream X are unimportant. The voltages developed across the series combination S1–S4 add together. Also, the voltages developed across the series combination S'1–S'4 are additive. Therefore, the exact positions of the bubble domains with respect to the sensors are not important.

The embodiment of FIG. 12 combines a counter and a comparison means in a single bridge structure. However, other embodiments can be visualized which may or may not combine these two functions into a single structure.

What has been described in a symmetric switching device using magnetic bubble domains which provides the basic functions of counting, generation of a control stream for personalization of the device, and a comparison means to ascertain the state of the input data bits relative to the personality given to the symmetric switching device. It will be readily understood by those skilled in the art that various forms of counters, comparison means, and control bubble stream sources can be envisioned to perform the symmetric switching functions. However, these various embodiments are within the broad scope of the teaching of this invention which is to provide symmetric devices capable of performing any logic function using magnetic bubble domains. In addition, it should be noted that the data inputs can be represented by bubble domains having different properties, rather than by the presence and absence of bubble domains. In this case, the same principles are involved and the same basic structures can be utilized. In contrast with prior art devices, single circuit structures can be used universally in order to make logic and memory feasible on the same magnetic medium as the storage function.

What is claimed is:

1. A symmetric switching device for performing a desired function using magnetic bubble domains, comprising:
- a magnetic medium in which said bubble domains exist,
- a counter responsive to an input data pattern comprised of bubble domains representative of information, said counter including means for counting the number of said bubble domains in said input data pattern and means for providing an output indicative of said count,
- personalization means for providing a control pattern of bubble domains corresponding to said desired function, and
- comparison means for comparing the output of said counter with said bubble domains in said control pattern.

2. The device of claim 1, wherein said counter includes means for simultaneously receiving a plurality of bubble domains in said input data pattern.

3. The device of claim 1, further including means for storage of said bubble domains in said magnetic medium, and means for removing said bubble domains from storage and moving said removed domains to said symmetric switching device.

4. The device of claim 1, wherein said counter includes means for providing a bubble domain output from said counter.

5. The device of claim 1, where said personalization means includes means for providing a plurality of different control data patterns, in accordance with different desired functions.

6. The device of claim 1, where said counter, personalization means, and comparison means are comprised of patterns of magnetically soft material located near said magnetic sheet, said device further including field means for producing a reorienting magnetic field substantially in the plane of said magnetic medium.

7. The device of claim 1, further including means for removing bubble domains from said device after the output of said counter is compared with said control pattern in order to clear said device.

8. The device of claim 1, where said counter includes means for receiving said input data bubble domains, means for rearranging the relative positions of said input data bubble domains to provide a rearranged data pattern, and means for detecting a specified bubble domain in said rearranged data pattern.

9. A process for performing symmetric switching functions using magnetic bubble domains, comprising:
- providing a magnetic medium in which said bubble domains can exist,
- counting the number of magnetic bubble domains in an input data pattern and providing an output representing said count,
- providing a selected pattern of bubble domains corresponding to said function to be performed, and
- comparing said output representing said counting step with said selected pattern of bubble domains corresponding to said function, and
- providing an output representative of said comparison.

10. The process of claim 9, including the further step of providing a different pattern of bubble domains corresponding to another function to be preformed.

11. The process of claim 9, where said output of said counting step is comprised of a bubble domain.

12. The process of claim 11, where said output of said comparing step is a bubble domain.

13. The process of claim 9, where said counting step includes the steps of rearranging bubble domains in said input data pattern to provide a rearranged data pattern, and detecting a selected bubble domain in said rearranged data pattern.

14. A device for performing a desired function using magnetic bubble domains, comprising:
- a magnetic medium in which said bubble domains can exist,
- counter means for counting the number of bubble domains representing a particular information state in an input pattern of data bubble domains,
- means for providing a bubble domain representing the output of said counter,
- personalization means for providing a control pattern of bubble domains corresponding to said desired function, and
- comparison means for comparing the output of said counter with bubble domains in said control pattern, the output of said comparison means indicating the value of said function.

15. The device of claim 14, where said personalization means includes means for providing different control patterns corresponding to different functions to be performed by said device.

16. The device of claim 14, further including storage means for storing said bubble domains, and means for removing said bubble domains from said storage means and for moving said removed domains to said device to provide said input pattern thereto.

17. The device of claim 14, where said counter, said personalization means, and said comparison means are comprised of magnetically soft elements, said device further being comprised of a field source for providing a reorienting magnetic field substantially in the plane of said medium.

18. A device for performing a desired symmetric function using magnetic bubble domains, comprising:

a magnetic medium in which said bubble domains exist, counting means for counting data bubble domains representing data bits in an input data pattern, said counting means being comprised of means for permuting the position of said data bits in said input pattern to provide a permuted data pattern, source means for providing a bubble domain corresponding to a selected bubble domain in said permuted data pattern, personalization means for providing a pattern of magnetic bubble domains, said pattern corresponding to said desired symmetric function, comparison means for comparing said pattern of bubble domains produced by said personalization means with said bubble domain provided by said source means to provide an output representing the value of said function performed on said input data bubble domains.

19. The device of claim 18, where said counter and said personalization means are comprised of magnetically soft elements, said device further including field means for creating a reorienting magnetic field substantially in the plane of said magnetic medium.

20. The device of claim 18, where said means for permuting includes means for gravitating bubble domains representing a particular data state to desired locations in said permuted data pattern, and said source means includes means for providing a bubble domain corresponding to a bubble domain in said permuted data pattern having said particular data state.

21. The device of claim 20, where said means for permuting includes a plurality of positions for receiving said data bubble domains in said input pattern, and means for moving said bubble domains in said positions to said source means.

22. The device of claim 21, where said means for moving bubble domains in said positions includes means for providing pusher bubble domains which interact with said data bubble domains.

23. The device of claim 18, further including means for clearing said bubble domains from said device after said symmetric function is performed.

24. The device of claim 18, where said counting means includes means for receiving input data bubble domains simultaneously.

25. The device of claim 18, where said personalization means includes means for changing the pattern of bubble domains provided by said personalization means in order to change the function performed by said device.

26. A device for performing a desired symmetric function using magnetic bubble domains, comprising:

a magnetic medium in which said bubble domains can exist, an input means for receiving input bubble domains representative of information, means for permuting the positions of said input bubble domains to provide a permuted bubble domain pattern, source means for providing a bubble domain corresponding to a selected bubble domain having a particular data state in said permuted bubble domain pattern, personalization means for providing a control bubble domain pattern corresponding to said desired function, and comparison means for comparing said bubble domain produced by said source means with said bubble domain pattern produced by said personalization means.

27. The device of claim 26, where said input means is comprised of at least one idler position for receiving said input bubble domains.

28. The device of claim 26, including means for clearing bubble domains provided by said source means and said personalization means from said device after said symmetric function is performed.

29. The device of claim 26, further including means for moving said permuted bubble domain pattern to said source means to trigger said source means for provision of said bubble domain corresponding to a selected bubble domain in said permuted data pattern.

30. The device of claim 26, where said personalization means includes a controlled source of bubble domains and a propagation means for movement of said control bubble domain pattern to said comparison means.

31. The device of claim 30, further including means for recirculating said control bubble domain pattern.

32. The device of claim 26, where said input means, said means for permuting, said personalization means, and said comparison means are comprised of magnetically soft elements, said device further including magnetic field means for producing a reorienting magnetic field substantially in the plane of said magnetic medium.

33. The device of claim 26, where said comparison means is comprised of an AND circuit.

34. The device of claim 26, where said comparison means is a bridge circuit comprised of at least one sensor responsive to said input bubble domains and at least one other sensor responsive to said control bubble domain pattern.

* * * * *